UNITED STATES PATENT OFFICE.

JUDSON A. DE CEW, OF MONTREAL, QUEBEC, CANADA.

ROSIN SIZING COMPOSITION.

1,203,857. Specification of Letters Patent. Patented Nov. 7, 1916.

No Drawing. Application filed October 12, 1914. Serial No. 866,294.

*To all whom it may concern:*

Be it known that I, JUDSON A. DE CEW, a citizen of the Dominion of Canada, and resident of the city of Montreal, in the Province of Quebec and Dominion of Canada, have invented certain new and useful Improvements in Rosin Sizing Compositions, of which the following is a full, clear, and exact description.

This invention relates to resinous compositions, consisting essentially of rosin soap, and adapted for sizing paper.

The resinous material generally used for this purpose is ordinary colophony rosin, distilled or extracted from pine. I have discovered that the properties of this material are not always suitable for paper sizing, as there is a variation in the properties of the rosin used. Sometimes the rosin breaks down readily in the form of powder when used in sizing paper, and its efficiency in retarding the penetration of aqueous material is greatly reduced. I have found that the efficiency of the rosin depends to a great extent upon its elasticity and its colloidal properties when precipitated from solution.

My invention is designed to greatly increase the efficiency of the rosin by giving to the precipitated rosin a colloidal character and increasing its elastic properties. I have discovered that the rosins have a solvent effect upon ordinary crude rubber, and that various quantities of rubber can be dissolved in the rosin. Therefore, by incorporating into the rosin, such products as rubber, gutta-percha, balata and the like, before the rosin is precipitated from a soap solution, I impart to the product colloidal properties which add greatly to the bulk and quality of the precipitate, and increase its efficiency as a sizing material for paper. A very small quantity of crude rubber, gutta-percha, balata or the like is sufficient to give the rosin the properties desired, with the result that the rosin and consequently the paper will be more elastic. In the sizing process, this rubber-like product will also act as a protective colloid.

In practice, the crude rubber, gutta-percha, or balata is added to the molten rosin in proper proportions, and stirred until it is dissolved. Approximately one pound of rubber or elastic constituent may be used to 100 lbs. of rosin, but excellent results have been obtained by using a considerably smaller percentage of rubber. The solution takes place rapidly at a temperature approaching the melting point of the material used. This product may be incorporated into a rosin soap already manufactured, or it may be saponified directly by the addition of an alkali. This may be accomplished either by adding a sufficient quantity of rubber to the rosin and then saponifying by means of a suitable alkali, such as sodium carbonate or the like, or the rosin may be first saponified and then further rosin, in which rubber is dissolved, may be added. The stiffness and colloidal strength of the rosin soap thus produced varies directly with the amount and quality of the rubber product used.

Although I find the use of gutta-percha gives the most satisfactory results, any rubber, balata, rubber substitute or the like may be used, and it will be understood that any of the so-called rubber products, which dissolved in saponified rosin will form an elastic colloid, are contemplated in this invention. The sizing material thus produced is especially suitable for bag or wrapping papers or the like, in which pliability is desired. I have also found that this sizing material has by its colloidal character and properties proved effective where other sizing materials have failed.

Having thus described my invention, what I claim is:—

1. A sizing product consisting of a resinate in which is dissolved a rubber product substantially in the proportions specified.

2. A sizing product consisting of a rosin soap in which is dissolved approximately 1% of rubber material.

3. A sizing product comprising a saponified rosin containing rosin and a rubber product dissolved therein substantially in the proportions specified.

4. A paper sizing comprising a resinate of an alkali metal holding in solution a rubber product in the proportions specified.

In witness whereof, I have hereunto set my hand, in the presence of two witnesses.

JUDSON A. DE CEW.

Witnesses:
S. R. W. ALLEN,
G. M. MORELAND.